(12) United States Patent
Bessho et al.

(10) Patent No.: US 7,600,769 B2
(45) Date of Patent: Oct. 13, 2009

(54) FRAME STRUCTURE FOR WORK VEHICLE

(75) Inventors: Hiroki Bessho, Sakai (JP); Yoshifumi Horiuchi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/051,831

(22) Filed: Mar. 19, 2008

(65) Prior Publication Data

US 2009/0066052 A1 Mar. 12, 2009

(30) Foreign Application Priority Data

Sep. 10, 2007 (JP) ............................. 2007-234292
Sep. 10, 2007 (JP) ............................. 2007-234294

(51) Int. Cl.
*B62D 21/11* (2006.01)

(52) U.S. Cl. ............................. 280/124.109

(58) Field of Classification Search .......... 280/124.109; 180/291, 295, 296, 299, 311, 312
See application file for complete search history.

(56) References Cited

U.S. PATENT DOCUMENTS 4,773,675 A * 9/1988 Kosuge ..................... 280/781
5,180,025 A * 1/1993 Yeh et al. .................. 180/65.5
5,915,495 A * 6/1999 Kerlin et al. ............... 180/291
6,357,769 B1 * 3/2002 Omundson et al. .... 280/124.109

FOREIGN PATENT DOCUMENTS

JP 2004-50954 A 2/2004

* cited by examiner

*Primary Examiner*—Faye M. Fleming
(74) *Attorney, Agent, or Firm*—The Webb Law Firm

(57) ABSTRACT

A work vehicle comprising a pair of left and right wheels; a vehicle body frame supported at least partially by the pair of left and right wheels; and a suspension provided between the pair of left and right wheels and the vehicle body frame, the suspension being a five-linkage type rigid axle suspension including: a pair of left and right upper arms and a pair of left and right lower arms for positioning the pair of left and right wheels in the longitudinal direction of the vehicle body, a lateral rod for positioning the pair of left and right wheels in the lateral direction of the vehicle body, a pair of left and right coil springs for absorbing shocks from the road, and a pair of left and right dampers for controlling the movements of the pair of left and right coil springs. An auxiliary frame is further provided for supporting the pair of left and right wheels, an engine, and a transmission device, wherein the auxiliary frame is suspended on the vehicle body frame via the suspension.

7 Claims, 18 Drawing Sheets

Fig. 19
(A)
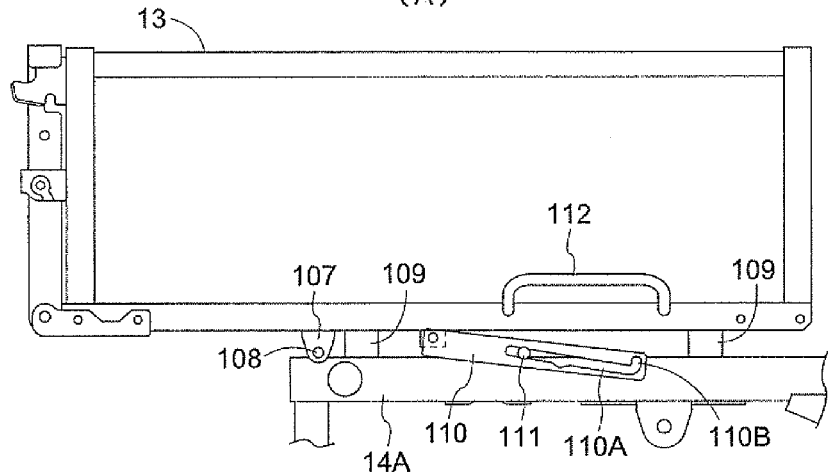
(B)
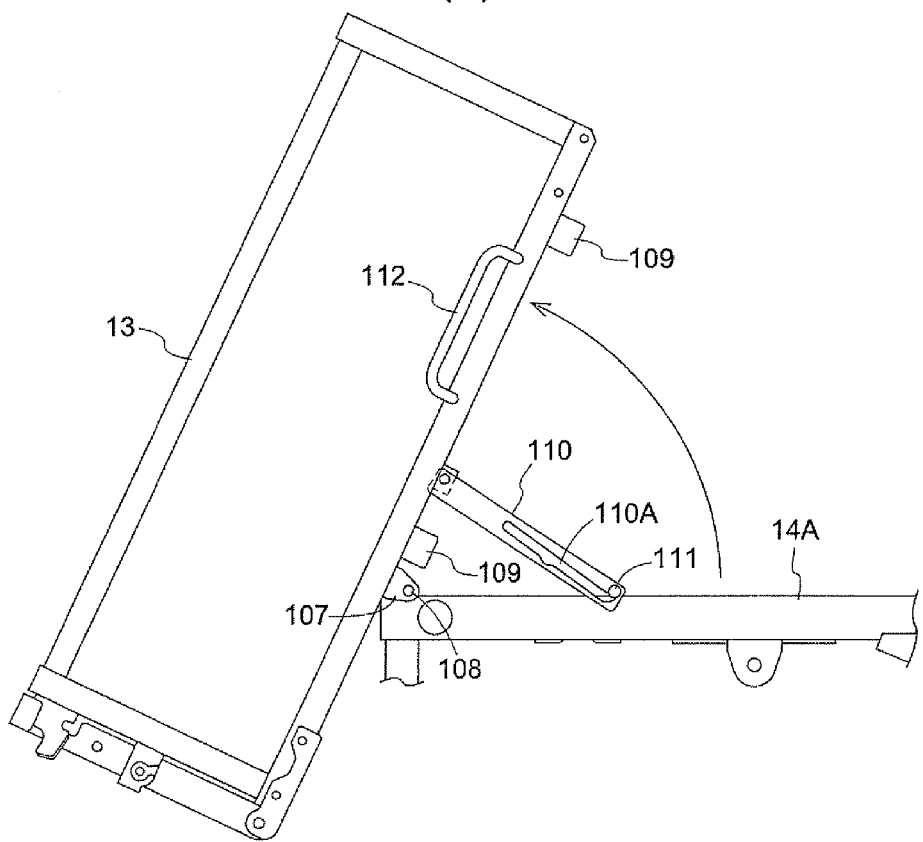

.US 7,600,769 B2

FRAME STRUCTURE FOR WORK VEHICLE

BACKGROUND OF THE INVENTION

1. Field of the Invention

The present invention relates to frame structure for a work vehicle in which a vehicle body frame is provided with suspension for suspending a pair of left and right vehicle wheels.

2. Description of the Related Art

In one example of a vehicle body structure for a work vehicle such as is described above, the engine is mounted via a plurality of anti-vibration rubber pads to an engine mounting frame connected to a main frame, a transmission case and a hydraulic continuously variable transmission are installed in a transmission support frame connected to the main frame, and a pair of left and right rear wheels driven by power from the engine is suspended on the main frame via a leaf spring type of rigid axle suspension (for example, see Japanese Laid-open Patent Application No. 2004-50954).

In the configuration described above, since the left and right rear wheels driven by power from the engine are suspended via the suspension on the vehicle body frame containing the engine and the transmission apparatus, the left and right rear wheels become displaced in relation to the engine and the transmission apparatus when the suspension reduces vibrations or shocks from the road. Therefore, the system for transmitting power to the left and right tear wheels must be provided with universal couplings or the like that allow displacement in the left and right rear wheels in relation to the engine and the transmission apparatus.

Since the engine is mounted in the vehicle body frame via a plurality of anti-vibration rubber pads, the power transmission system running from the engine to the transmission apparatus must be provided with universal couplings or the like that allow relative displacement between the engine and the transmission apparatus.

In other words, attempting to create a smoother ride by reducing vibrations or shocks from the road with a suspension and by absorbing engine vibrations with anti-vibration rubber pads has led to more complex configurations and higher costs due to installing a plurality of universal couplings or the like.

SUMMARY OF THE INVENTION

An object of the present invention is to provide a work vehicle having an improved frame in which the configuration is simplified and a smooth ride can be ensured.

The work vehicle according to an aspect of the present invention comprises:

a pair of left and right wheels;

a vehicle body frame supported at least partially by the pair of left and right wheels; and a suspension provided between the pair of left and right wheels and the vehicle body frame, the suspension being a five-linkage type rigid axle suspension including:

a pair of left and right upper arms and a pair of left and right lower arms for positioning the pair of left and right wheels in the longitudinal direction (or fore-and-aft direction) of the vehicle body;

a lateral rod for positioning the pair of left and right wheels in the lateral direction of the vehicle body;

a pair of left and right coil springs for absorbing shocks from the road;

a pair of left and right dampers for controlling the movements of the pair of left and right coil springs; and an auxiliary frame for supporting the pair of left and right wheels, an engine, and a transmission device, wherein the auxiliary frame is suspended on the vehicle body frame via the suspension.

According to this aspect, the engine and the transmission devices are installed along with the left and right front wheels on the auxiliary frame suspended via the suspension on the vehicle body frame, whereby the engine and the transmission devices are displaced integrally along with the left and right wheels in relation to the vehicle body frame when the suspension reduces vibrations or shocks from the road. Therefore, there is no need to provide the power transmission system for the left and right wheels with universal couplings or the like so as to allow the left and right wheels to be displaced in relation to the engine and the transmission devices.

Therefore, it is possible to simplify the configuration by reducing the number of components and to ensure a smooth ride in which vibrations or shocks from the road are reduced and engine vibrations are absorbed.

BRIEF DESCRIPTION OF THE DRAWINGS

FIG. 19 is a partial side view showing the configuration of the load-carrying platform.

DESCRIPTION OF THE PREFERRED EMBODIMENTS

An embodiment in which the power transmission structure for a work vehicle according to the present invention is applied to a multipurpose work vehicle, which is an example of a work vehicle, will be described hereinbelow as an example of a preferred embodiment for carrying out the present invention, with reference to the drawings.

Figure 1:
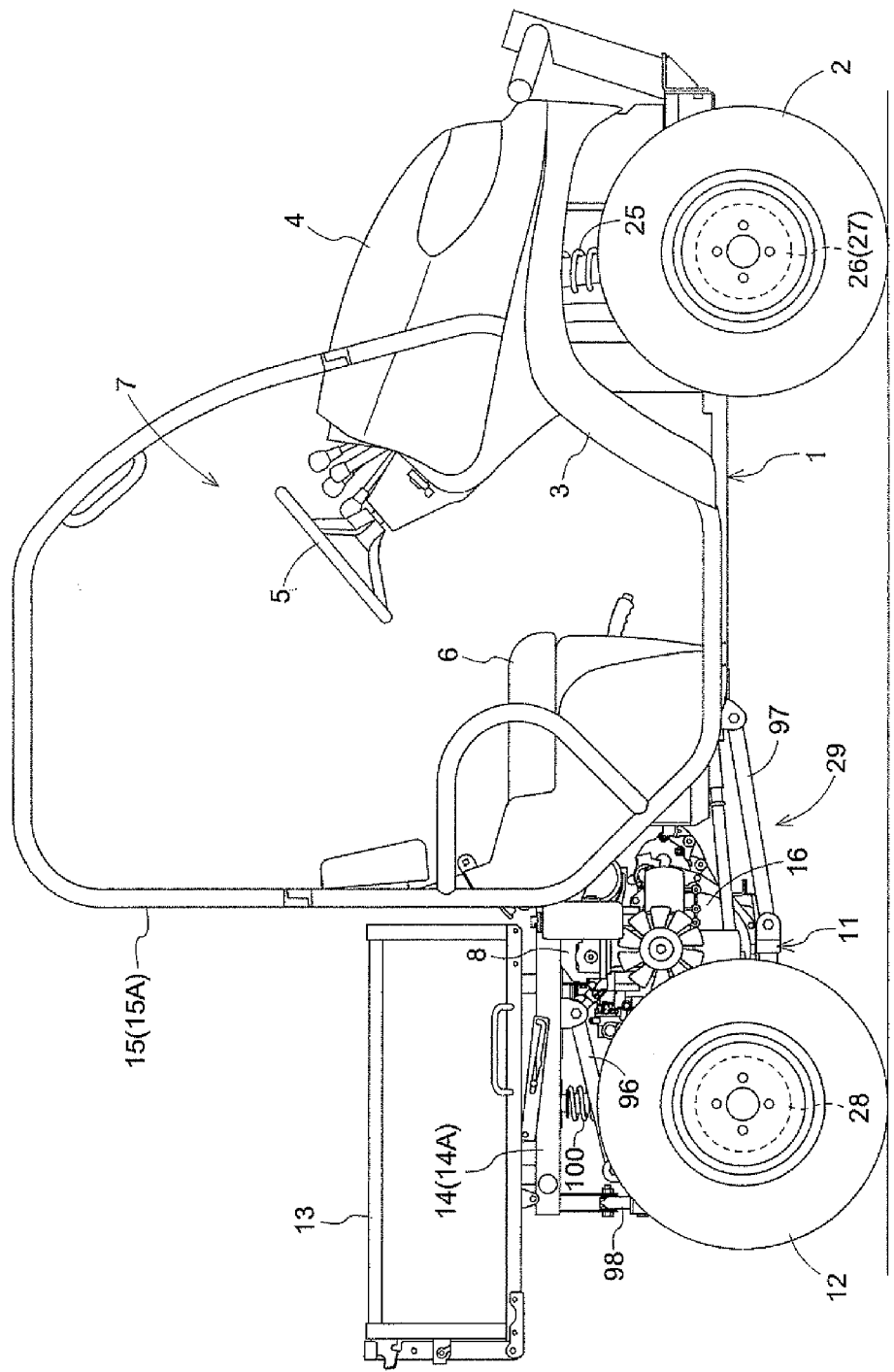
FIG. 1 is an overall side view of a multipurpose work vehicle.
Figure 2:
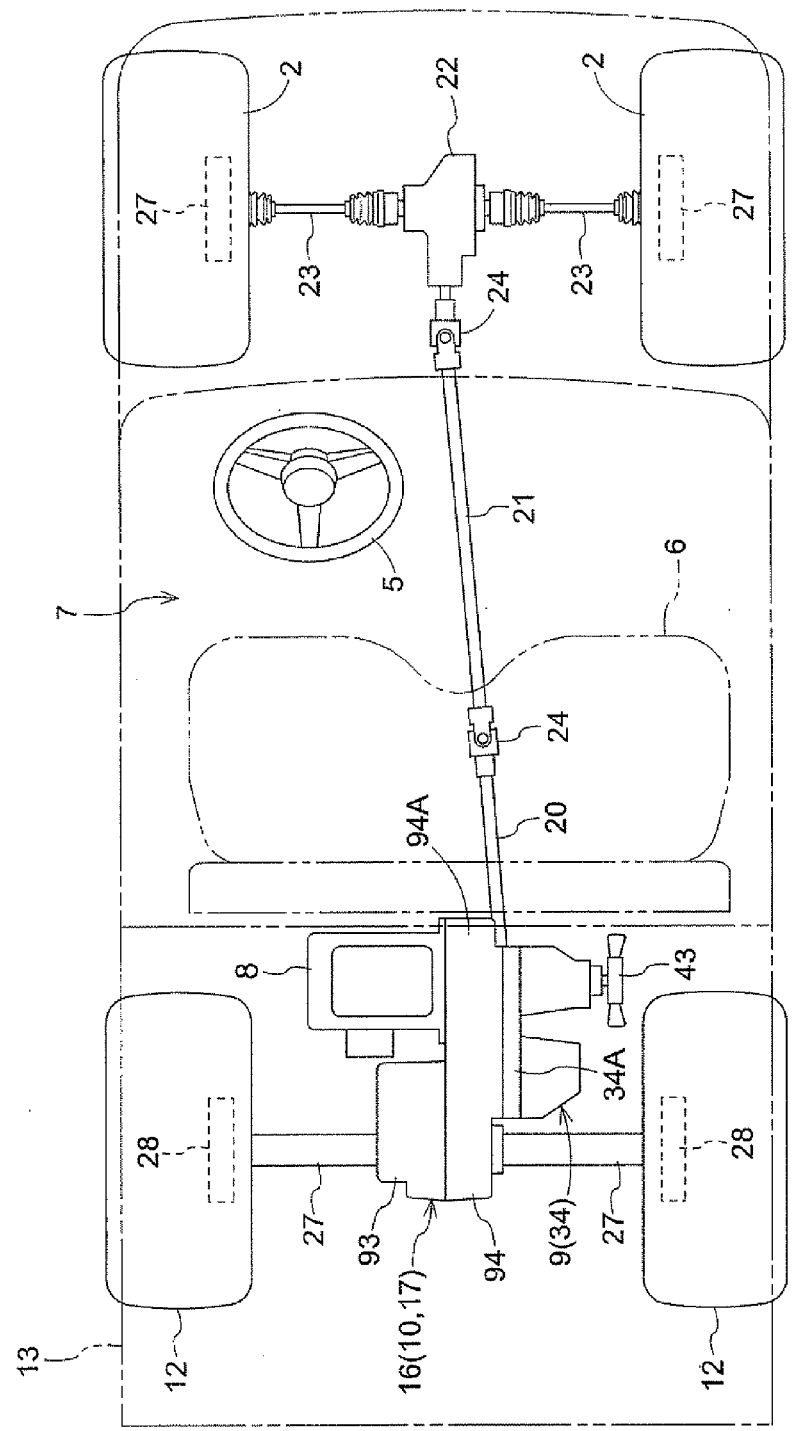
FIG. 2 is a schematic plan view showing the power transmission structure of the multipurpose work vehicle.
Figure 3:
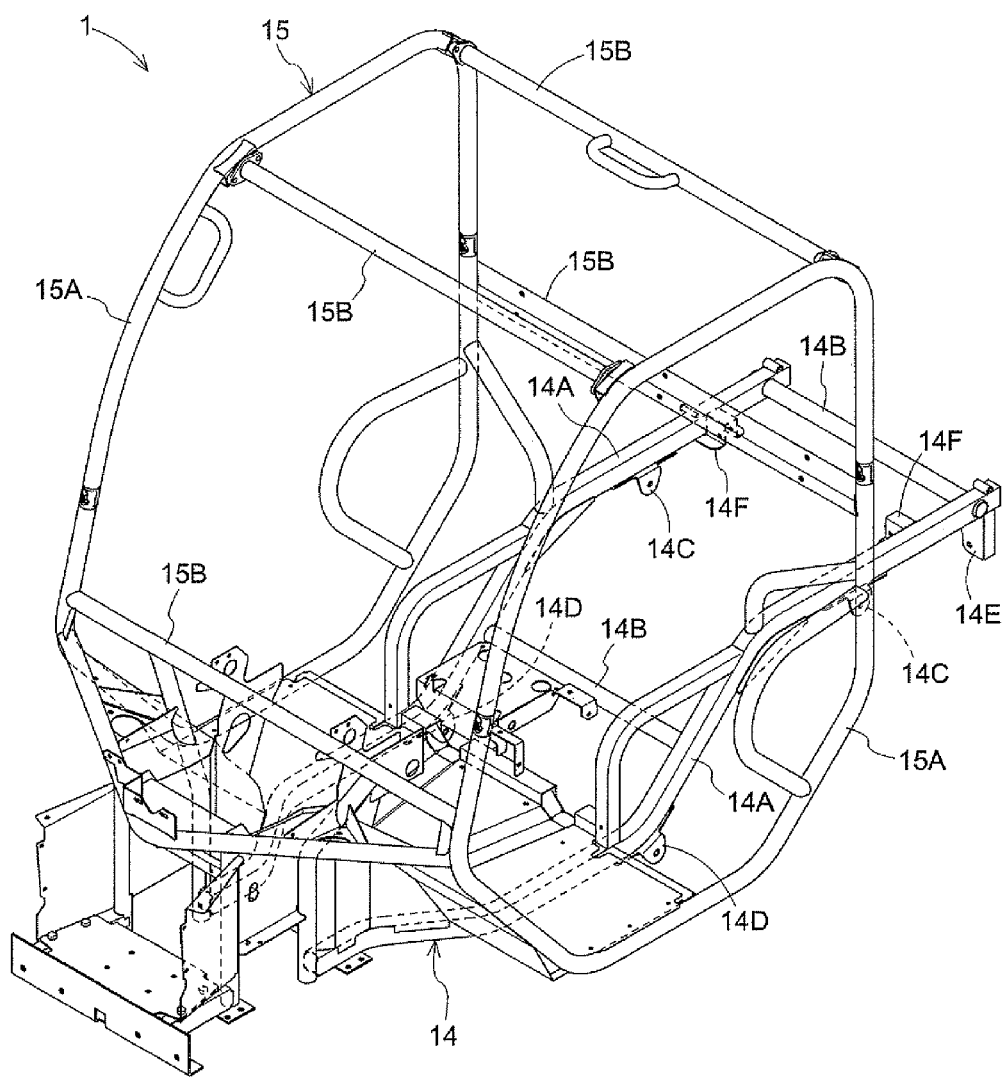
FIG. 3 is a perspective view showing the configuration of the vehicle body frame.
Figure 4:
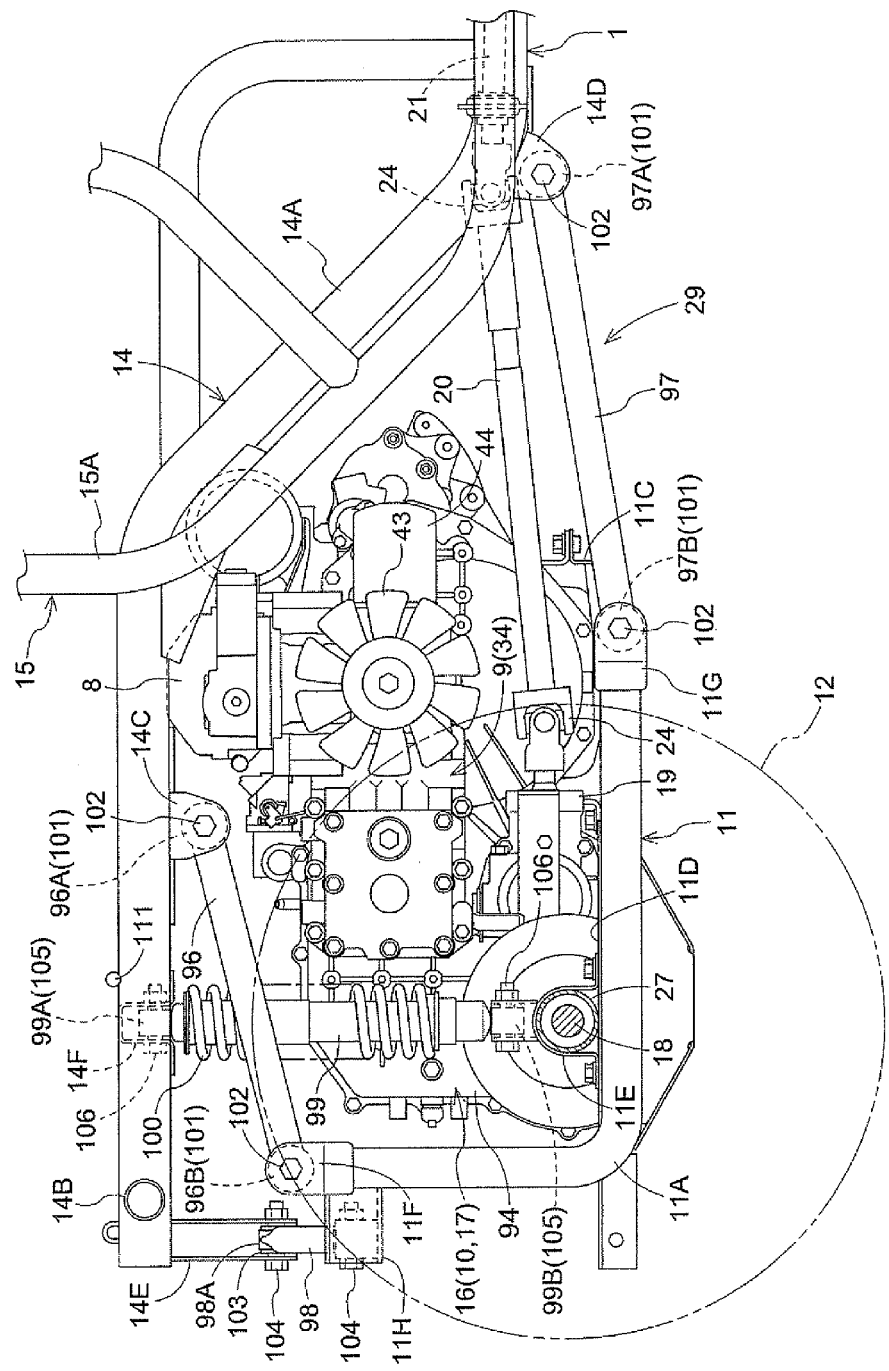
FIG. 4 is a partial longitudinal cross-sectional side view showing the support structure for the engine, the HST, the transmission, the rear wheels, and other components.
Figure 5:
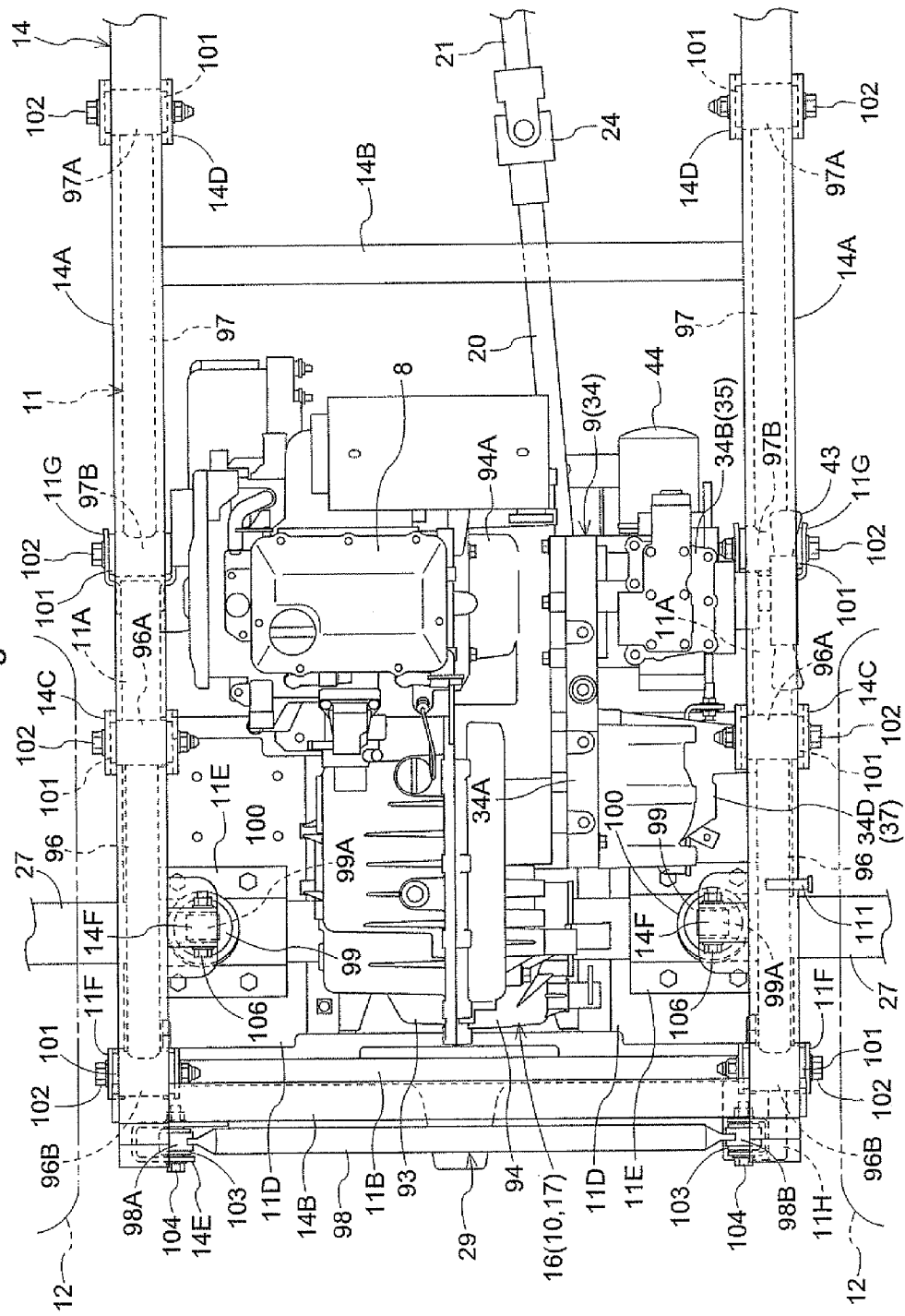
FIG. 5 is a partial lateral cross-sectional plan view showing the support structure for the engine, the HST, the transmission, the rear wheels, and other components.
Figure 6:
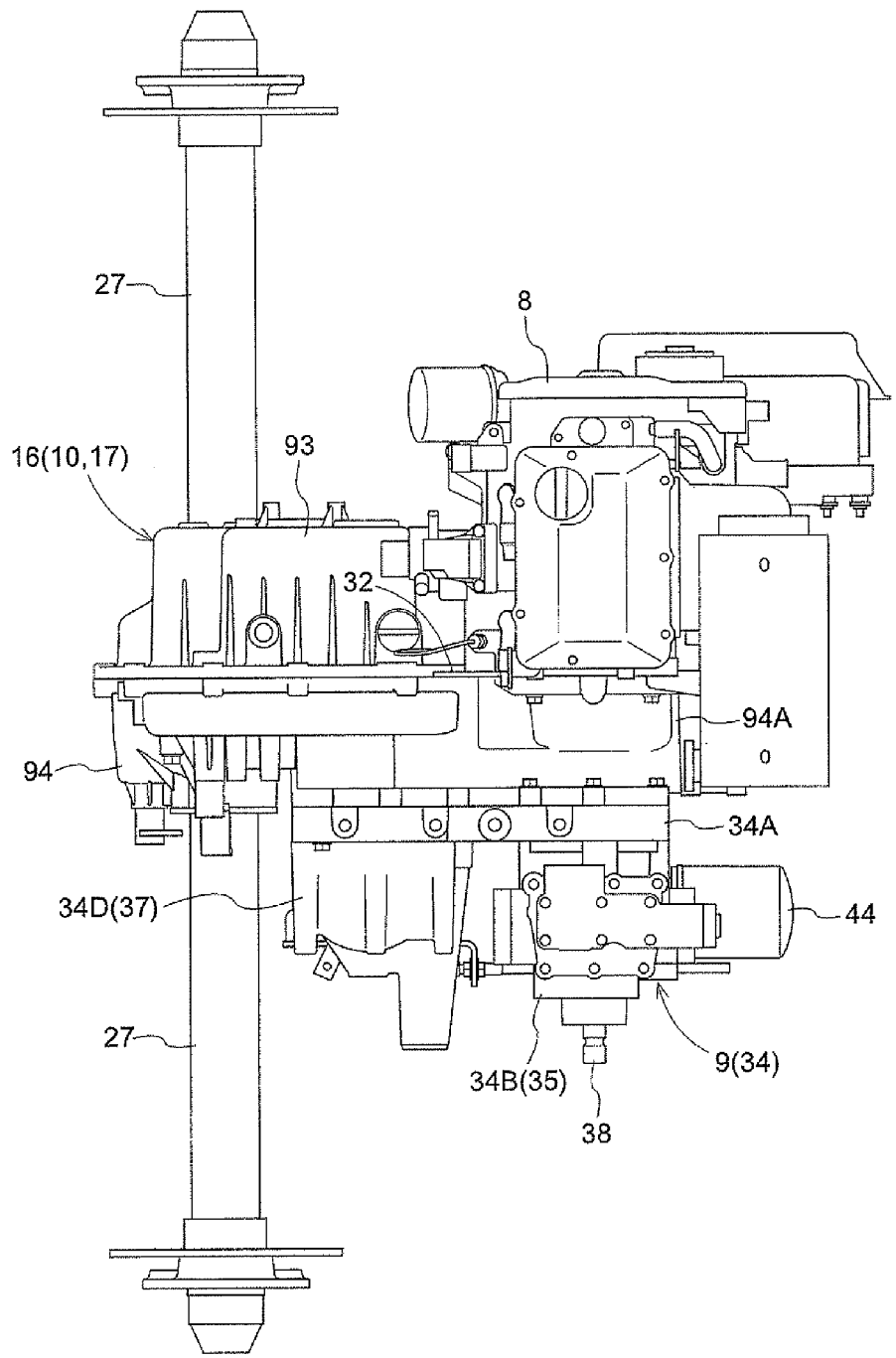
FIG. 6 is a partial plan view showing the manner in which the HST, the transmission, and the rear axle case are connected to the engine.
Figure 7:
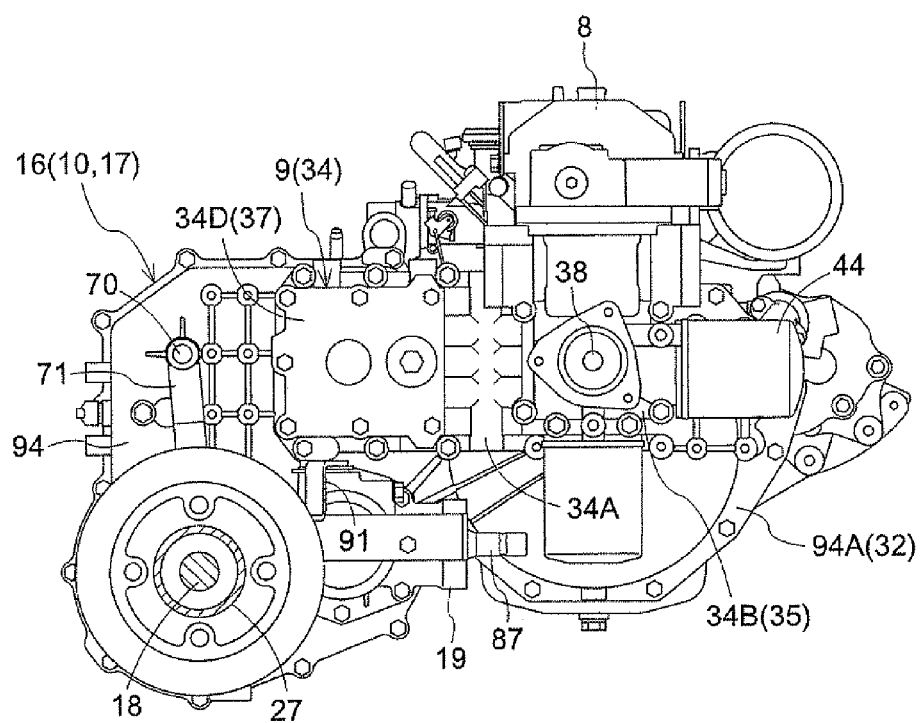
FIG. 7 is a partial side view showing the manner in which the HST, the transmission, and the rear axle case are connected to the engine.

FIG. 1 is an overall side view of a multipurpose work vehicle. FIG. 2 is a schematic plan view showing the power transmission configuration of the multipurpose work vehicle. The multipurpose work vehicle comprises a pair of left and right front wheels 2, a bottom cover 3 that doubles as a front fender, a hood 4, and other components installed on the front of a vehicle body frame 1, as shown in these drawings. In the longitudinal middle of the vehicle body frame 1, a steering wheel 5 for steering the front wheels, a sofa-style seat 6, and other components are provided to form a cab 7. At the rear of the vehicle body frame 1 are installed an engine 8, a hydrostatic transmission (hereinafter abbreviated as HST) 9 as the primary transmission apparatus, a transmission 10 as a secondary transmission apparatus, an auxiliary frame 11 for supporting these components, a pair of left and right rear wheels 12, a load-carrying platform 13 capable of dump-swinging, and other components.

The vehicle body frame 1 is configured with a protective frame 15 or the like that forms a cab space and that is connected to a base frame 14, as shown in FIG. 1 and FIGS. 3 through 5. The base frame 14 is configured from a pair of left and right side members 14A, a plurality of cross members 14B that connect the side members, and other components. The left and right side members 14A are bent so that the front sides are positioned below the cab 7, and the rear sides are positioned behind the seat 6. The protective frame 15 is configured from a pair of left and right side frames 15A formed in the shape of a closed loop, a plurality of cross members 15B connecting the side frames, and other components.

In this multipurpose work vehicle, power from the engine 8 is transmitted to the HST 9, the power reduced by the HST 9 is transmitted to the transmission 10, and the power reduced by the transmission 10 is divided in the transmission 10 into power for driving the rear wheels and power for driving the front wheels, as shown in FIGS. 1, 2, and 4 through 14.

The power for driving the rear wheels is transmitted to the left and right rear wheels 12 via a rear wheel differential device 17 provided within a transmission case 16, which is a casing for the transmission 10, and also via a pair of left and right rear axles 18.

The power for driving the front wheels is configured by a front wheel power take-off device 19 connected to and installed on the lower right front of the transmission case 16, a first power transmission shaft 20 capable of expanding and contracting, a second power transmission shaft 21, a differential device 22 for the front wheels, a pair of left and right third power transmission shafts 23, a pair of left and right front axles (not shown), a plurality of universal couplings 24 that connect these components together, and other components.

The left and right front wheels 2 are supported via the front axles (not shown) or the like on front axle cases 26, which are independently suspended on the vehicle body frame 1 via a front suspension 25, as shown in FIGS. 1 and 2. A strut type independent suspension is used as the front suspension 25.

The left and right front axle cases 26 have wet multidisk brakes 27 installed as front wheel brakes in their interiors.

The left and right rear wheels 12 are supported on the transmission case 16 and on a pair of left and right rear axle cases 27 that extend outward to the left and right from the transmission case 16, via the differential device 17 for the rear wheels, the rear axles 18, and other components, as shown in FIGS. 1, 2, and 4 through 10. The left and right rear axle cases 27 are supported on the auxiliary frame 11 along with the engine 8, the HST 9, the transmission 10, and other components. Disc brakes 28 are installed as rear wheel brakes on the protruding ends of the left and right rear axle cases 27.

The auxiliary frame 11 is configured from a pair of left and right side members 11A bent into L shapes, a plurality of cross members 11B that connect the side members, a first plate 11C for supporting the engine, a pair of left and right second plates 11D for supporting the rear axle cases, a pair of left and right holders 11E for holding the left and right rear axle cases 27 in place, and other components, as shown in FIGS. 4, 5, and 15 through 18. The left and right holders 11E are placed adjacent to the corresponding side members 11A farther inward in the vehicle body. The auxiliary frame 11 is suspended on the vehicle body frame 1 via a rear suspension 29. A five-linkage type rigid axle suspension is used as the rear suspension 29.

The engine 8 is mounted in a lateral orientation on the first plate 11C of the auxiliary frame 11 so that an output shaft 31 that rotates integrally with a flywheel 30 of the engine lies along the left and right width direction of the vehicle body, and that an end plate 32 of the engine is coplanar with the outer right side of the vehicle body, as shown in FIGS. 1, 2, and 4 through 11. An output gear 33 is fitted using a spline to the output shaft 31.

The HST 9 is configured with a hydraulic pump 35, a primary hydraulic motor 36, a secondary hydraulic motor 37, and other components provided within a housing 34 of the HST. The housing 34 is configured from a port block 34A, a first case 34B that covers the hydraulic pump 35, a second case 34C that covers the primary hydraulic motor 36, a third case 34D that covers the secondary hydraulic motor 37, and other components. An axial plunger type variable capacity pump is used as the hydraulic pump 35. An axial plunger type constant capacity motor is used as the primary hydraulic motor 36. An axial plunger type variable capacity motor is used as the secondary hydraulic motor 37.

The placement of the HST 9 is designed so that a pump shaft 38 as an input shaft thereof and a motor shaft 39 as an output shaft thereof lie along the left and right width direction of the vehicle body.

The hydraulic pump 35 has an inclined plate 35A that is operatively connected via a hydraulic servo mechanism (not shown) to a neutral two-way gear-change pedal (not shown) provided in the cab 7. The hydraulic servo mechanism is configured so as to tilt the inclined plate 35A of the hydraulic pump 35 on the basis of the depression of the gear-change pedal, wherein the inclined plate is tilted up to an angle corresponding to the amount by which the gear-change pedal is depressed. In other words, the gear-change operation of the HST 9 via the tilting of the pump inclined plate 35A can be performed by depressing the gear-change pedal.

In the secondary hydraulic motor 37, an inclined plate 37A is urged back into the neutral position by a pressure spring 40, and is tilted against the urging of the pressure spring 40 by the action of a piston 41. The piston 41 is connected to an oil supply passage (not shown) that supplies hydraulic fluid from the hydraulic pump 35 to the primary hydraulic motor 36 and the secondary hydraulic motor 37. The internal pressure of the oil supply passage varies in accordance with fluctuation in the travelling load. When the internal pressure of the oil supply passage exceeds a specific value due to an increase in the travelling load, the piston 41 tilts the inclined plate 37A of the secondary hydraulic motor 37 against the urging of the pressure spring 40 up to an angle of inclination at which the internal pressure of the oil supply passage is balanced with the urging force of the pressure spring 40. In other words, in cases in which the internal pressure of the oil supply passage exceeds a specific value due to an increase in the travelling load, the tilting of the motor inclined plate 37A results in the gear change operation of the HST 9. When this gear change operation is performed, the capacity of the entire hydraulic motor increases, the rotational speed of the motor shaft 39 decreases, and the motor shaft 39 produces a greater output torque. It is thereby possible to obtain a high output torque corresponding to the increase in the travelling load.

In cases in which the travelling load further increases and the internal pressure of the oil supply passage rises after the inclined plate 37A of the secondary hydraulic motor 37 has been tilted to the angle limit due to the increase in the travelling load, the internal pressure of the oil supply passage acts as reactive force that pushes the inclined plate 35A of the hydraulic pump 35 back towards the neutral position. The rotational speed of the motor shaft 39 can thereby be reduced further, and a higher output torque corresponding to an even higher travelling load can be obtained.

An input gear 42 that meshes with an output gear 33 of the engine 8 in a manner that enables reduced-gear power transmission is fitted using a spline to the left end of the pump shaft 38. In other words, the pump shaft 38 of the HST 9 is connected to the output shaft 31 of the engine 8 via the output gear 33 and the input gear 42. A cooling fan 43 is fitted using a spline to the right end of the pump shaft 38. An oil filter 44 is installed in the first case 34B.

The transmission 10 is installed laterally in the auxiliary frame 11, so that an input shaft 45 as a power transmission shaft of the transmission, a gear-change shaft 46, a reverse shaft 47, a first output shaft 48 for driving the rear wheels, and a second output shaft 49 for driving the front wheels lie along the left and right width direction of the vehicle body, as shown in FIGS. 1, 2, and 4 through 14.

The input shaft 45 is placed at the upper front of the transmission case 16, and the right end of the input shaft is fitted using a spline to the motor shaft 39 of the HST 9, as shown in FIGS. 8 through 14. A first low-speed gear 50, a first high-speed gear 51, and a first reverse gear 52 are integrally formed on the input shaft 45.

The gear-change shaft 46 is placed in the transmission case 16 so as to be positioned behind and below the input shaft 45. A second low-speed gear 53 that meshes with the first low-speed gear 50, a second high-speed gear 54 that meshes with the first high-speed gear 51, and a second reverse gear 55 are externally fitted and mounted on the gear-change shaft 46 in a manner that allows them to rotate relative to each other. A first shifter 56 that rotates integrally with the gear-change shaft 46 is disposed between the second low-speed gear 53 and the second high-speed gear 54 in the gear-change shaft 46. The first shifter 56 is provided so as to be capable being slidably displaced among a low-speed forward position where the first shifter meshes with the second low-speed gear 53, a high-speed forward position where the first shifter meshes with the second high-speed gear 54, and a neutral position where the first shifter does not mesh with either of the gears. A second shifter 57 that rotates integrally with the gear-change shaft 46 is disposed at a location to the left of the second reverse gear 55 in the gear-change shaft 46, and the second shifter 57 is provided so as to be capable of being slidably displaced between a reverse position where the second shifter meshes with the second reverse gear 55, and a neutral position where the second shifter does not mesh with the second reverse gear 55. A first reduction gear 58 is fitted using a spline with the right end of the gear-change shaft 46.

The reverse shaft 47 is placed in the transmission case 16 so as to be positioned behind and above the input shaft 45, and also above and in front of the gear-change shaft 46. A third reverse gear 59 that meshes with the first reverse gear 52 and the second reverse gear 55 is externally fitted and mounted to the reverse shaft 47 in a manner that enables relative rotation.

The first output shaft 48 is placed in the transmission case 16 so as to be positioned behind and below the gear-change shaft 46. A second reduction gear 60 that meshes with the first reduction gear 58 is fitted using a spline to the right end of the first output shaft 48. A pinion gear 61 is formed integrally in the first output shaft 48 at a location to the left of the second reduction gear 60. The pinion gear 61 meshes with a ring gear 62 provided to the rear wheel differential device 17, which is positioned behind and below the pinion gear 61.

The second output shaft 49 is placed in the transmission case 16 so as to be positioned below the right front of the first output shaft 48. A power transmission gear 63 that meshes with the second reduction gear 60 is formed integrally on the left end of the second output shaft 49.

A fork rod 64 and a camshaft 65 are longitudinally aligned while lying along the left and right width direction of the vehicle body, at a position that is behind the gear-change shaft 46 and above the differential device 17 in the transmission case 16.

A first shifting fork 66 that slides integrally with the first shifter 56, and a second shifting fork 67 that slides integrally with the second shifter 57, are externally fitted on the fork rod 64 in a manner that allows the shifting forks to slide relative to each other.

A first guiding groove 65S into which an engaging protuberance 66A formed integrally on the first shifting fork 66 is engageably inserted, and a second guiding groove 65B into which an engaging protuberance 67A integrally formed on the second shifting fork 67 is engageably inserted, are formed in the camshaft 65. The first guiding groove 65A and the second guiding groove 65B are formed so as to operatively guide the engaging protuberances 66A, 67A of the first shifting fork 66 and second shifting fork 67 as the camshaft 65 rotates. The first shifter 56 and second shifter 57 are thereby slidably displaced via the first shifting fork 66 and second shifting fork 67 into gear-change positions that correspond to the operating position of the camshaft 65. An operating gear 68 and a disc 69 that rotate integrally with the camshaft 65 are externally fitted over the right end of the camshaft 65.

A sector gear 72 that fluctuates integrally with an operating arm 71 via a coupling shaft 70 oriented left to right is meshed with the operating gear 68. The operating arm 71 is operatively connected to a gear-change lever (not shown) provided to the cab 7.

Four through-holes 69A, which are capable of holding the camshaft 65 in the neutral position, the low-speed forward position, the high-speed forward position, and the reverse position, are formed in the disc 69. A ball detent mechanism 73 is installed in the transmission case 16, and this detent mechanism 73 engages with the through-holes 69A to hold the camshaft 65 at the neutral position, the low-speed forward position, the high-speed forward position, and the reverse position.

In other words, by operating the gear-change lever, it is possible to switch the gear-change state of the transmission 10 among a neutral state in which the first shifter 56 and the second shifter 57 are both held in a neutral position, a low-speed forward state in which the first shifter 56 is held in a low-speed forward position and the second shifter 57 is held in a neutral position, a high-speed forward state in which the first shifter 56 is held in a high-speed forward position and the second shifter 57 is held in a neutral position, and a reverse state in which the first shifter 56 is held in a neutral position and the second shifter 57 is held in a reverse position.

Figure 8:
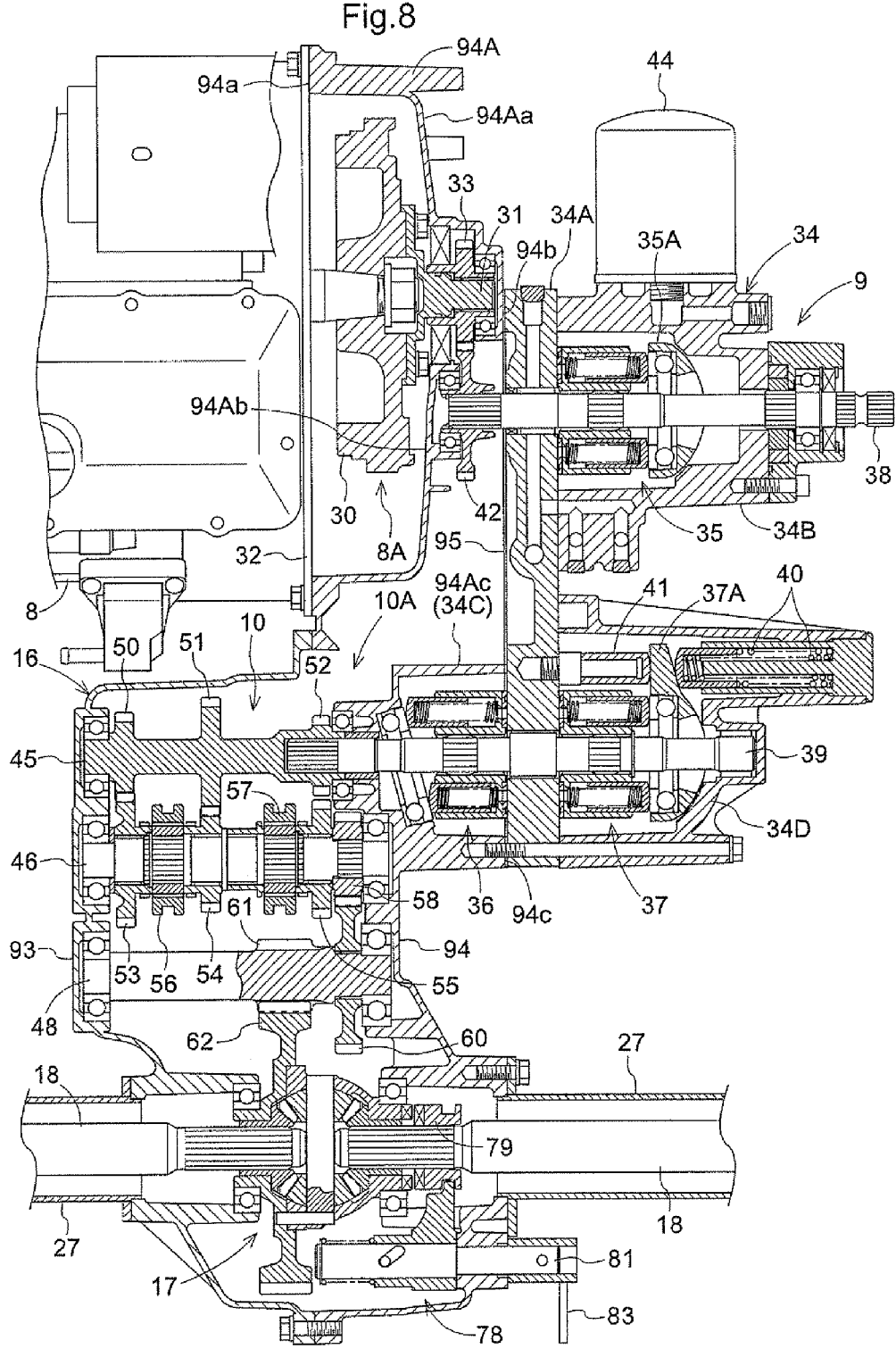
FIG. 8 is a partial transverse cross-sectional plan view showing the structure for transmitting power from the engine to the rear axles.
Figure 9:
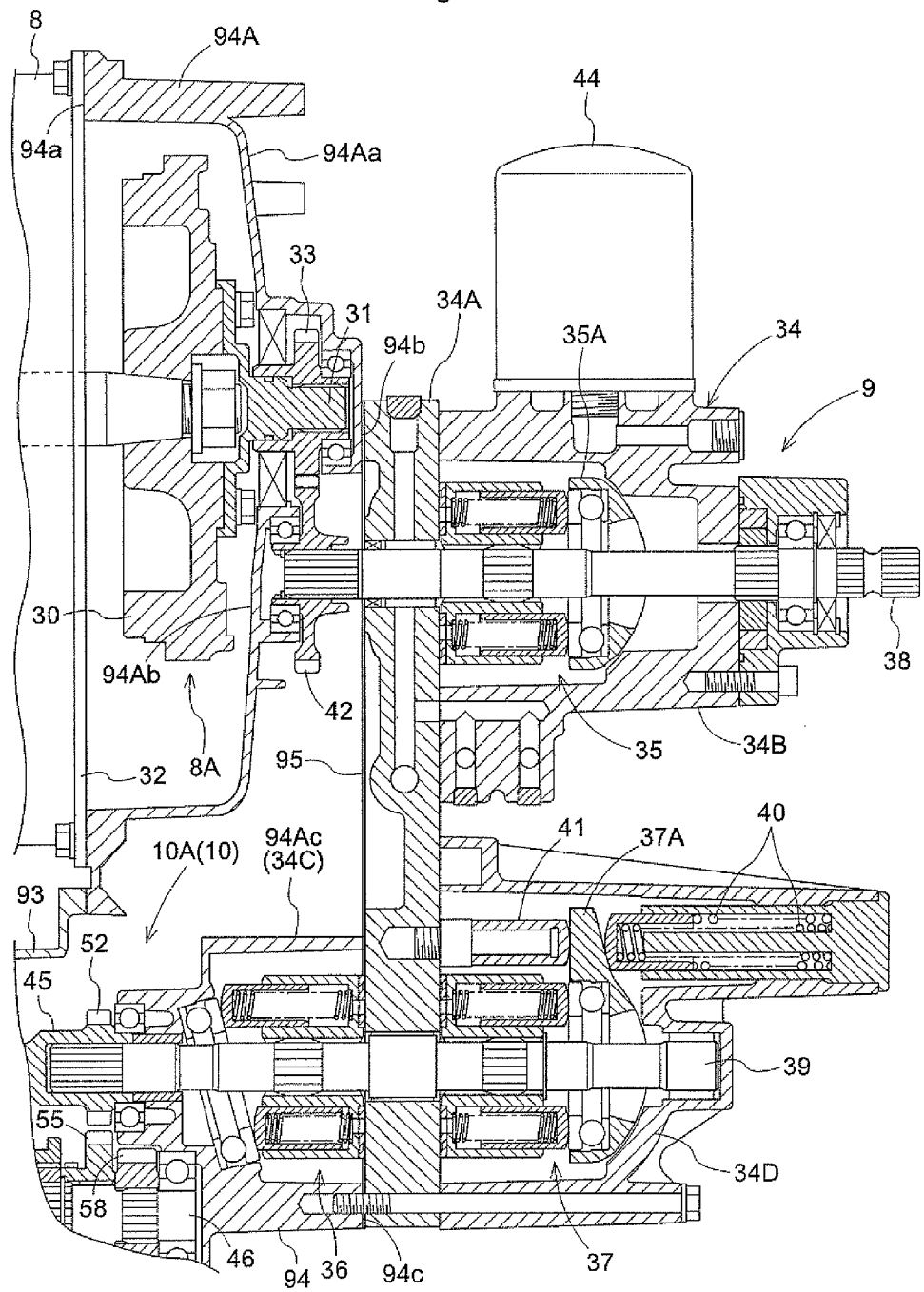
FIG. 9 is a partial transverse cross-sectional plan view showing the structure for transmitting power from the engine to the transmission.
Figure 10:
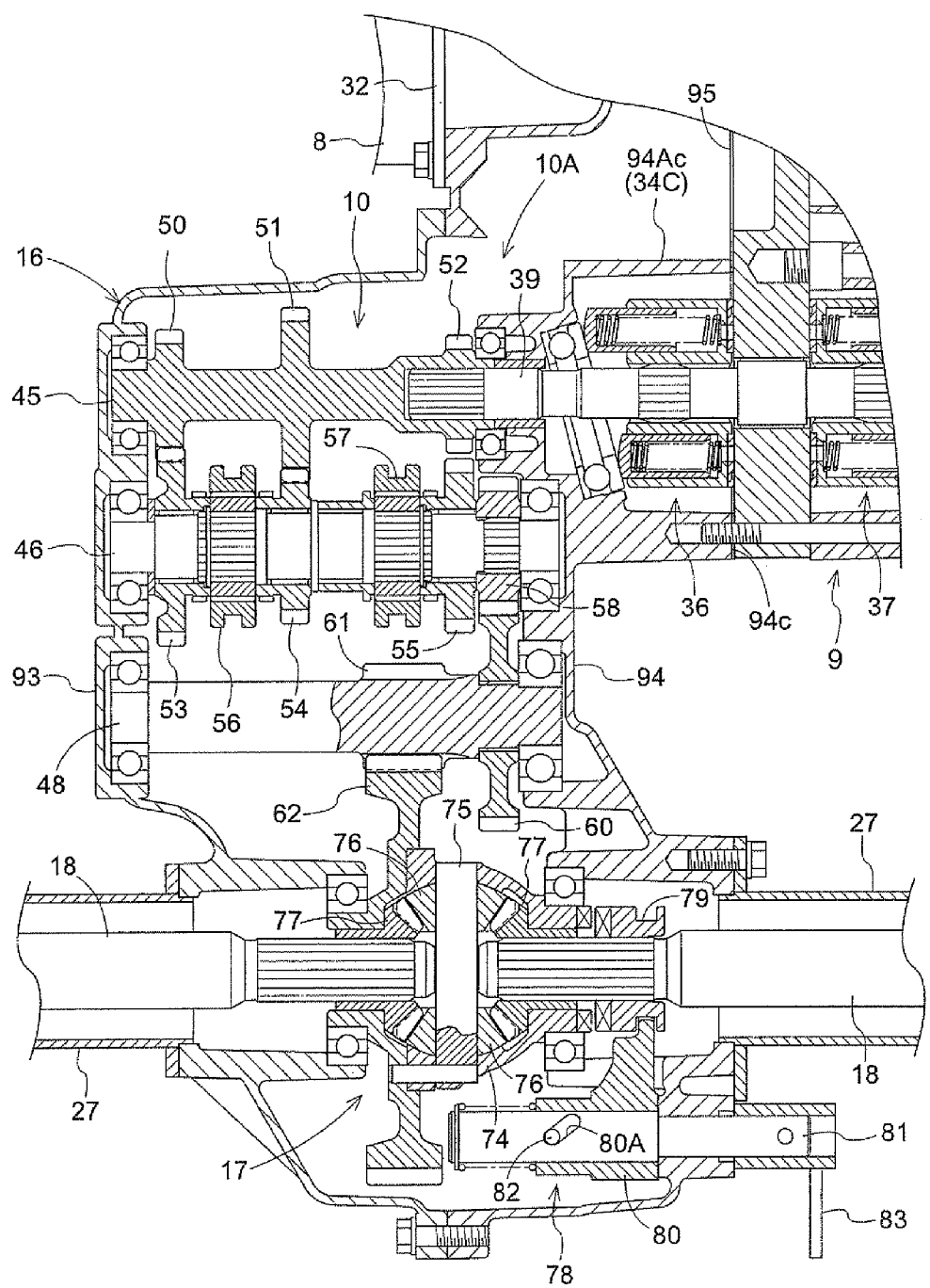
FIG. 10 is a partial transverse cross-sectional plan view showing the configuration of the transmission.
Figure 11:
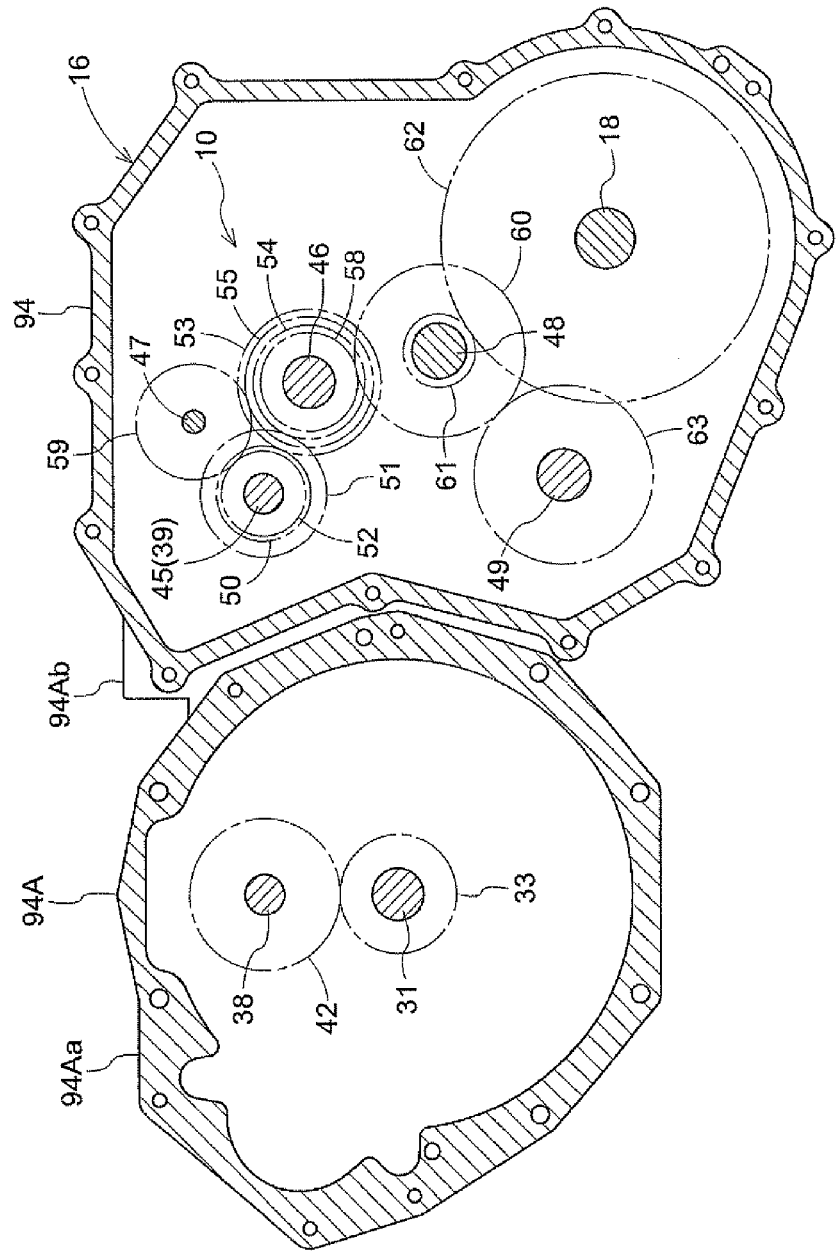
FIG. 11 is a partial longitudinal cross-sectional side view showing the structure for transmitting power from the engine to the rear axles.
Figure 12:
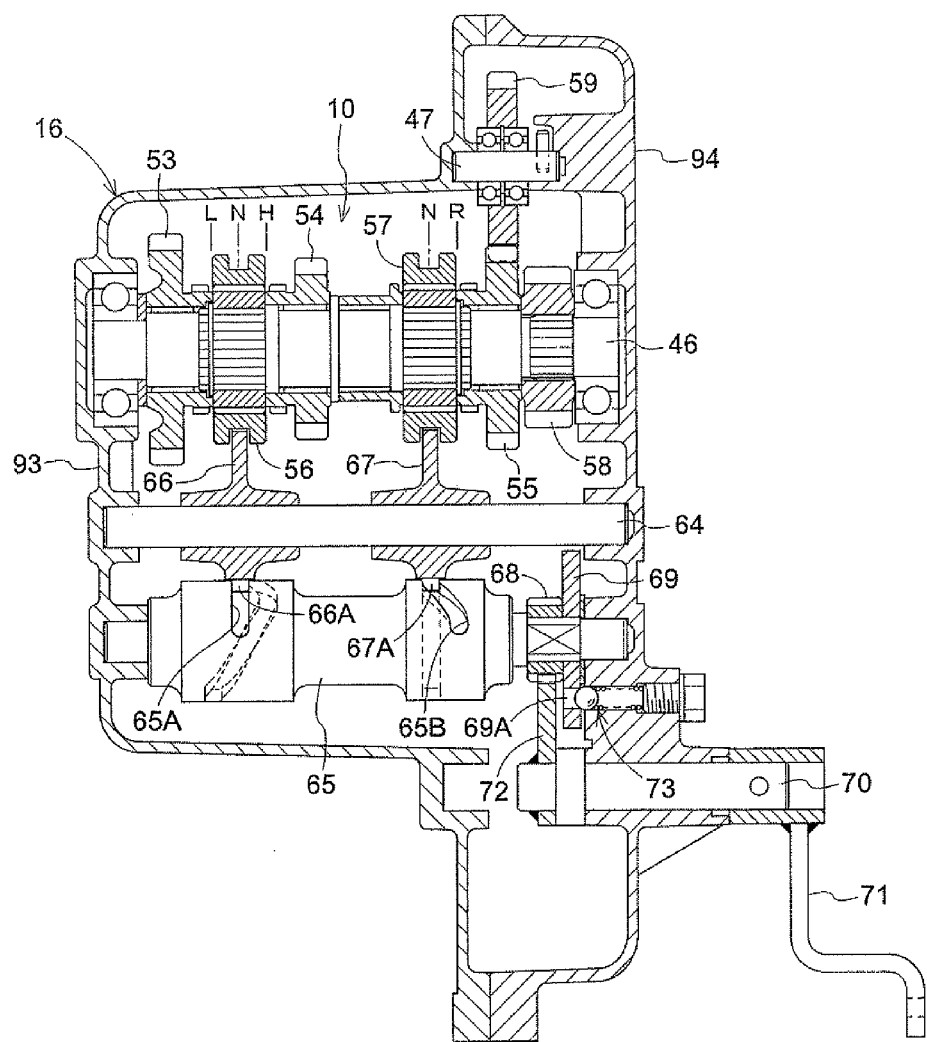
FIG. 12 is a partial transverse cross-sectional plan view showing the operational structure of the transmission.

The differential device 17 for the rear wheels is configured from a casing 74 that rotates integrally with the ring gear 62, a support shaft 75 that is installed in the casing 74 and that lies orthogonal to the rear axles 18, a pair of pinion gears 76 that fits externally over both ends of the support shaft 75 and that is capable of rotating relative to each other, a pair of left and right side gears 77 that are fitted inside the casing 74 to be capable of rotating relative to each other and that are fitted using splines on the corresponding rear axles 18, and other components, as shown in FIGS. 8 and 10.

The transmission case 16 is equipped with a lock mechanism 78 that prevents the rear wheel differential device 17 from causing differential motion between the left and right rear wheels 12 in conjunction with the depression of a diff-lock pedal (not shown) provided in the cab 7.

The lock mechanism 78 is configured from a clutch 79 that is fitted using a spline to the right rear axle 18 and that prevents differential motion, a shifting fork 80 that slides integrally with the clutch 79, a left-to-right oriented operating shaft 81 that supports the shifting fork 80 in a manner that allows the shifting fork 80 to rotate and slide in relative fashion, an operatively connecting pin 82 that operatively connects the shifting fork 80 with the operating shaft 81, an operating arm 83 that is integrally and rotatably connected to the operating shaft 81, and other components.

A camshaft 80A through which the operatively connecting pin 82 is engageably inserted is formed in the shifting fork 80. The operatively connecting pin 82 rotates integrally with the operating shaft 81. The operating arm 83 is operatively connected to the diff-lock pedal. The camshaft 80A is formed so that the shifting fork 80 is slidably displaced in conjunction with the rotation of the operatively connecting pin 82, whereby the clutch 79 is slidably displaced between a locked position of being interlocked with the casing 74 of the differential device 17, and a lock-releasing position where the interlocking is released.

Figure 14:
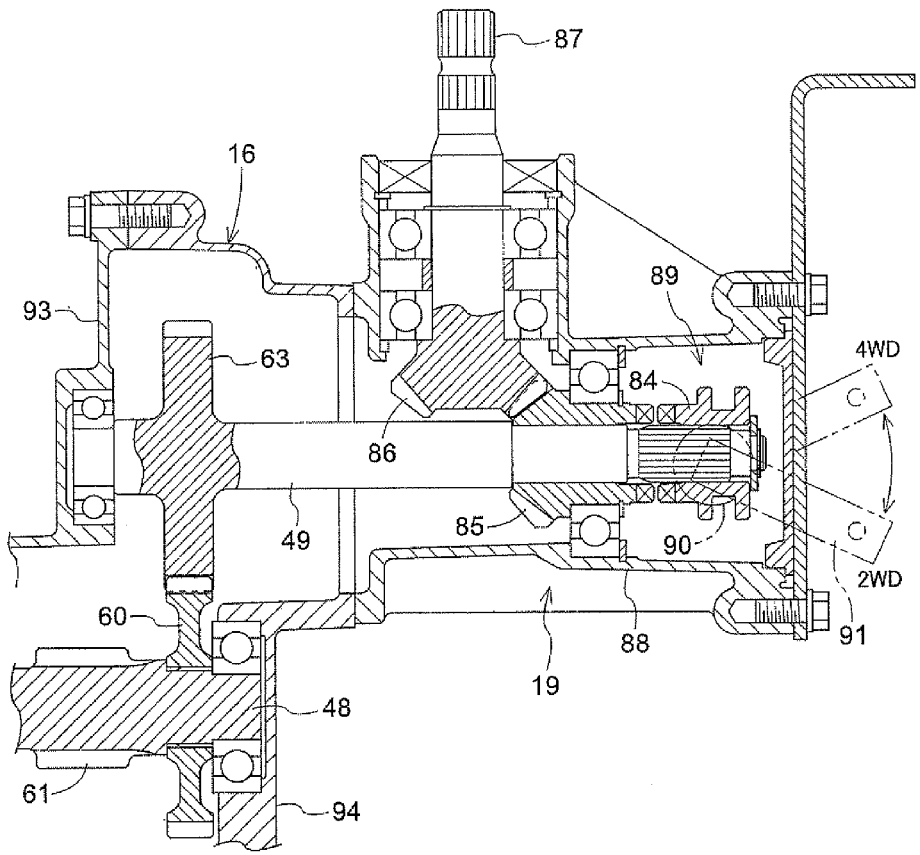
FIG. 14 is a partial transverse cross-sectional plan view showing the configuration of the power take-off device.
Figure 15:
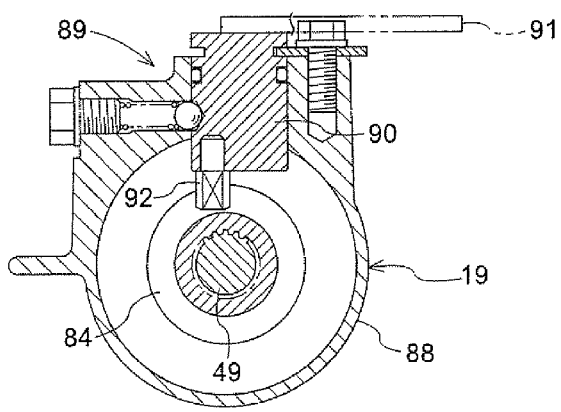
FIG. 15 is a partial longitudinal cross-sectional side view showing the operational structure of the power take-off device.
Figure 16:
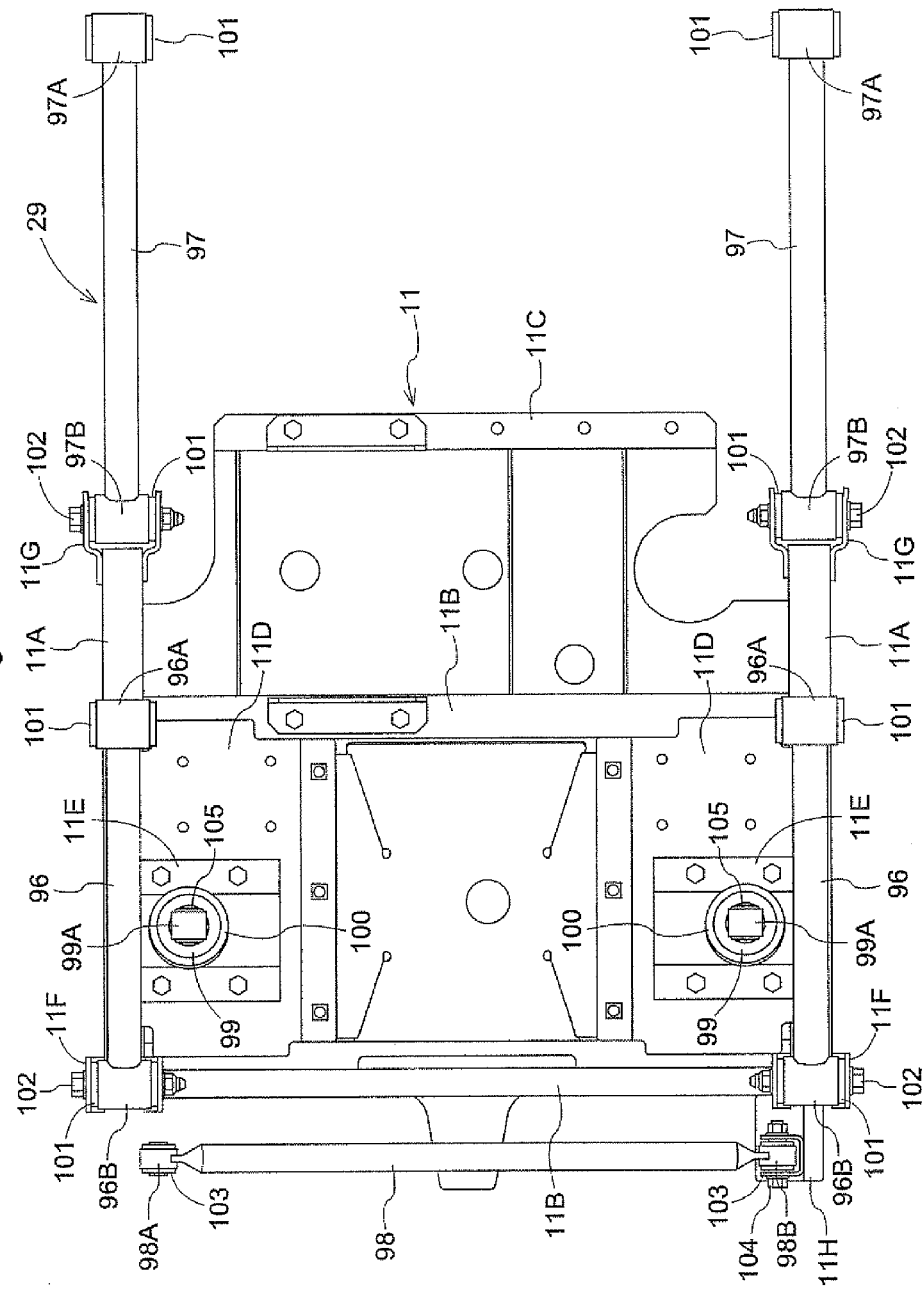
FIG. 16 is a partial plan view showing the configuration of the rear suspension.
Figure 17:
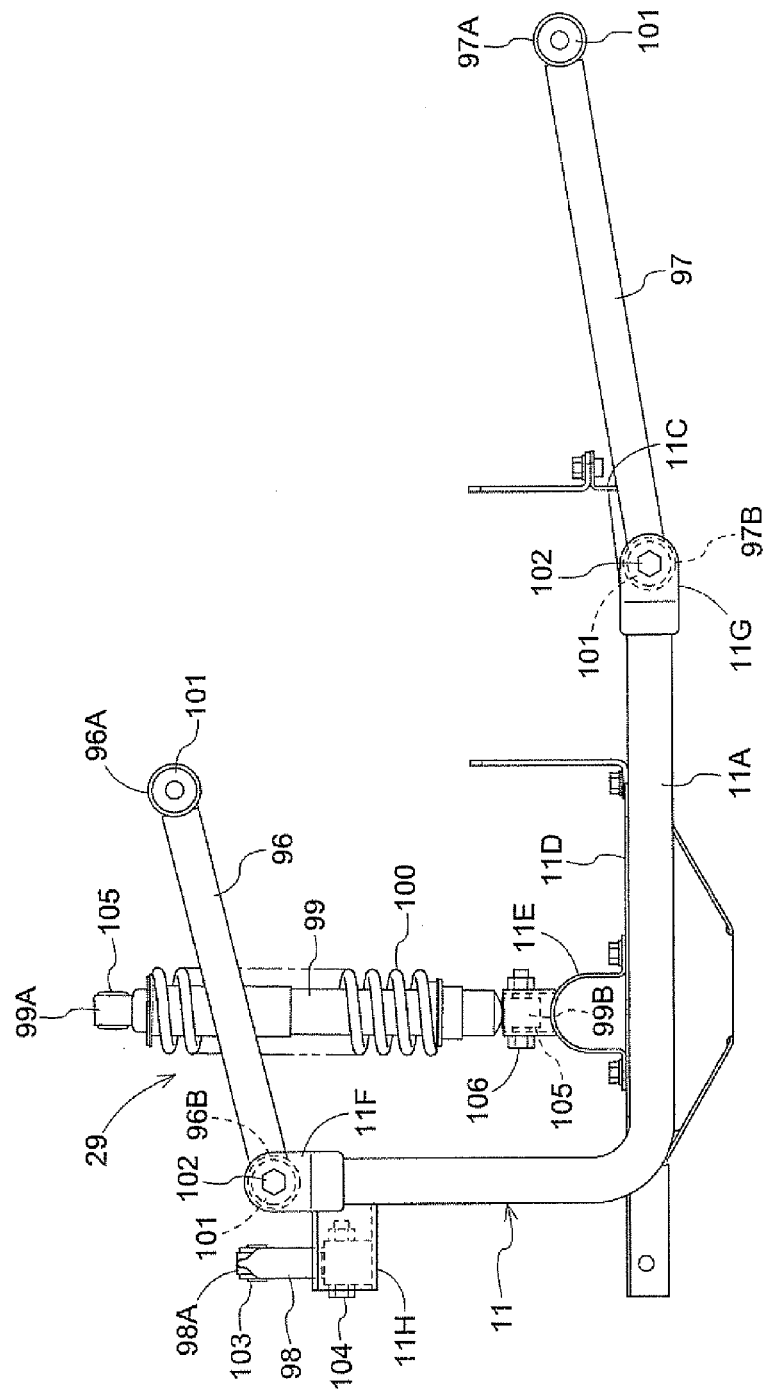
FIG. 17 is a partial side view showing the configuration of the rear suspension.
Figure 18:
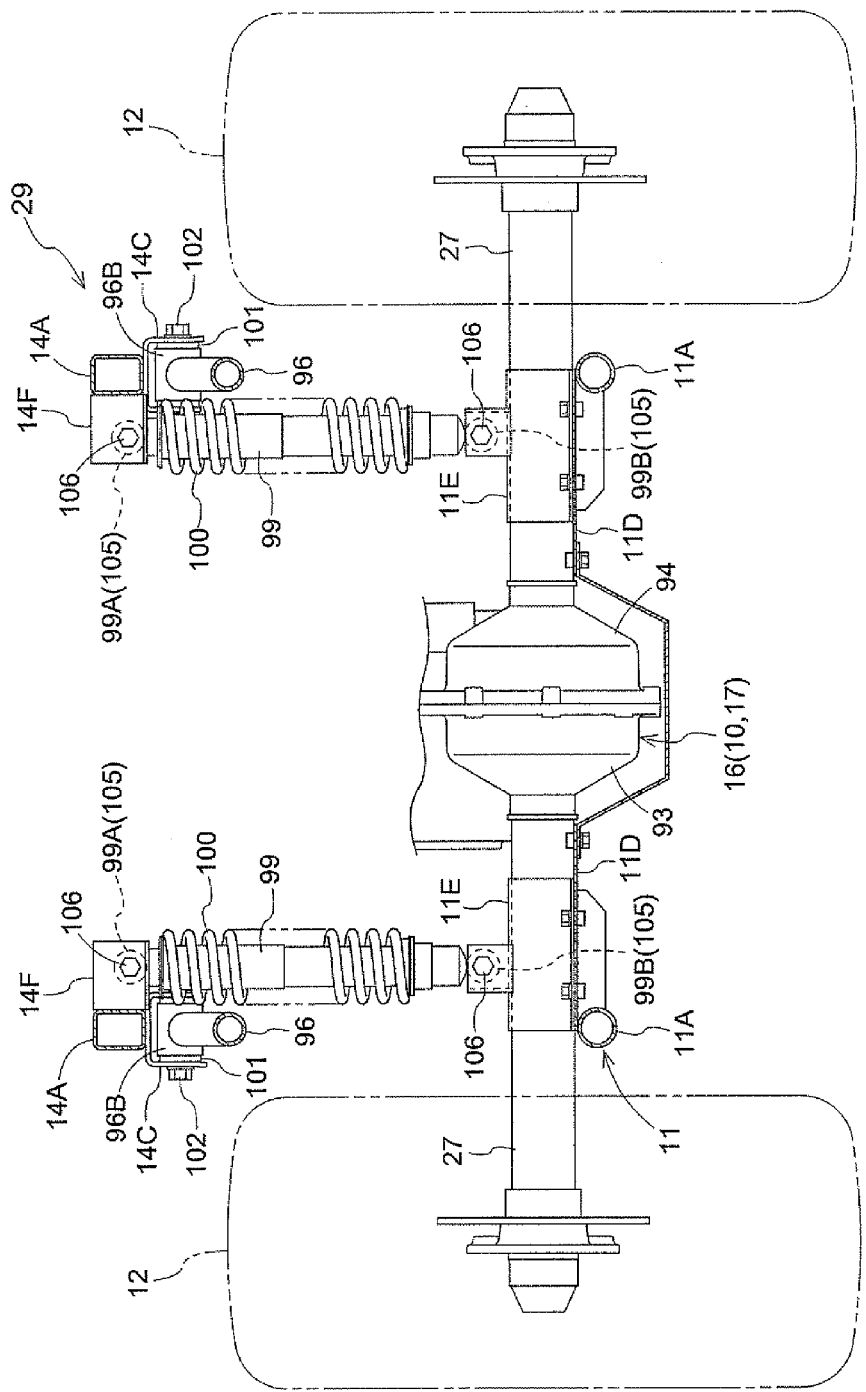
FIG. 18 is a partial longitudinal cross-sectional rear view showing the configuration of the rear suspension.

The power take-off device 19 for the front wheels is configured from a front wheel power take-off clutch 34 that is fitted using a spline on the right end of the second output shaft 49, a first bevel gear 85 that fits externally over the second output shaft 49 in a manner that allows relative rotation, a power take-off shaft 87 on which a second bevel gear 86 that meshes with the first bevel gear 85 is formed integrally, a casing 88 connected to the transmission case 16 so as to cover these components, and other components, as shown in FIGS. 14 and 15.

The casing 88 of the power take-off device 19 is provided with a drive switching mechanism 89 that switches between a four-wheel drive state in which the clutch 84 is interlocked with the first bevel gear 85, and a two-wheel drive state in which the interlocking of the clutch 84 with the first bevel gear 85 is released, in conjunction with the operation of a switching lever (not shown) provided in the cab 7.

The drive switching mechanism 89 is configured from a vertically oriented operating shaft 90 that is supported on the casing 88 and that is capable of relative rotation, an operating arm 91 that is integrally and rotatably connected to the operating shaft 90, and other components. An eccentric cam 92 is integrally formed on the lower end of the operating shaft 90, and this eccentric cam 92 slidably displaces the clutch 84 between a power transmission position where the clutch is interlocked with the first bevel gear 85, and a non-power transmission position where the interlocking is released, in conjunction with the rotation of the operating shaft 90. The operating arm 91 is operatively connected to a switching lever.

The transmission case 16 is configured from a left-side first case 93 and a right-side second case 94, and these two cases are connected, thereby forming a housing space for housing the transmission 10 and the differential device 17 for the rear wheels, as shown in FIGS. 2, 4 through 12, and 14. A protrusion 94A that protrudes from an input unit 10A of the transmission 10 towards an output unit 8A of the engine 8 is integrally formed on the second case 94. The protrusion 94A is formed so as to have a first case portion 94Aa that covers the flywheel 30, the output gear 33, and other components provided to the engine 8; a second case portion 94Ab that covers the input gear 42 and other components provided to the pump shaft 38; and a third case portion 94Ac that covers the primary hydraulic motor 36 of the HST 9.

The left end edge of the protrusion 94A is a peripheral edge 94a of the first case portion 9Aa, and this peripheral edge 94a is connected to the end plate 32 of the engine 8. The right end edge of the protrusion 94A is a peripheral edge 94b of the second case portion 94Ab, and this peripheral edge 94b and a peripheral edge 94c of the third case portion 94Ac are connected to the port block 3 of the HST 9 via a gasket 95.

The pump side of the port block 34A of the HST 9 is thereby connected to the end plate 32 of the engine 8 via the first case portion 94Aa and the second case portion 9b of the transmission case 16, and the motor side of the port block 3 is connected to the input unit 10A of the transmission 10 via the third case portion 94Ac of the transmission case 16, so that the port block 34A extends between the engine 8 and the transmission 10.

In other words, with this configuration, the second case 94 of the transmission case 16 is also used as the second case 34C of the HST 9. The port block 34A of the HST 9 also serves as the right side wall of the transmission case 16, forming a housing space for housing the input gear 42 and other components between the transmission case 16 and the second case 94. The structural components of the HST 9 and the transmission case 16 can thereby be reduced.

Moreover, since the protrusion 9 of the second case 94 in the transmission case 16 serves as a connecting member for connecting the engine 8 and transmission 10, the configuration can be simplified and costs can be reduced by reducing the number of components, in comparison with cases in which a special connecting member is provided.

Furthermore, since the port block 34A of the HST 9 functions as a reinforcing member for reinforcing the protrusion 94A of the second case 94 that connects the engine 8 to the transmission 10, the strength of the connection between the engine 8 and the transmission 10 can be improved without providing a special reinforcing member.

With this power transmission structure, as previously described, the output shaft 31 of the engine 8, the pump shaft 38 and motor shaft 39 of the HST 9, and the power transmission shafts 45 to 49 of the transmission 10 are disposed in a left-to-right orientation while parallel to the left and right rear axles 18. The output shaft 31 of the engine 8, the pump shaft 38 and motor shaft 39 of the HST 9, and the power transmission shafts 45 to 49 of the transmission 10 can thereby be disposed so as to have small longitudinal intervals between these components. With this type of arrangement, the engine 8, the HST 9, and the transmission 10 can be placed in a manner that reduces their lengths in the longitudinal direction (or fore-and-aft direction) of the vehicle body. The transmission 10 can also be configured in a manner that reduces the length of the transmission in the longitudinal direction of the vehicle body. As a result, the entire length of the vehicle body can be reduced.

By connecting the pump shaft 38 of the HST 9 to the output shaft 31 of the engine 8, and the motor shaft 39 of the HST 9 to the input shaft 45 of the transmission 10, the HST 9 can be disposed to the right of the laterally oriented engine 8 and transmission 10 so that, when viewed from the side, the HST 9 overlaps the engine 8 and transmission 10. The entire length of the vehicle body can thereby be reduced in comparison with cases in which the engine 8, the HST 9, and the transmission 10 are aligned in a row along the longitudinal direction of the vehicle body.

Moreover, by placing the power transmission shafts 45 to 49 of the transmission 10 in a left-to-right orientation parallel to the left and right rear axles 18, flat gears that are less expensive than bevel gears can be used as the pinion gear 61 and the ring gear 62, which are installed as final gears that connect the first output shaft 48 of the transmission 10 with the left and right rear axles 18 in a manner that enables power transmission.

The rear suspension 29 is configured from a pair of left and right upper arms 96 and a pair of left and right lower arms 97 for positioning the left and right rear wheels 12 with respect to the longitudinal direction of the vehicle body; a single lateral rod 98, a pair of left and right dampers 99, and a pair of left and right coil springs 100, for positioning the left and right rear wheels 12 with respect to the left-to-right direction of the vehicle body; and other components, as shown in FIGS. 1, 3 through 5, and 16 through 18.

The left and right upper arms 96 and the left and right lower arms 97 are disposed in a longitudinal orientation so as to be positioned directly below the side members 14A of the base frame 14. Connecting bosses 96A, 96B, 97A, 97B are integrally mounted on both ends of the left and right upper arms 96 and lower arms 97.

The front bosses 96A in the left and right upper arms 96 are connected, via rubber bushes 101, left-to-right oriented bolts 102, and the like, to brackets 14C provided at the rear parts of the left and right side members 14A in the base frame 14. The rear bosses 96B are connected, via rubber bushes 101, left-to-right oriented bolts 102, and the like, to brackets 11F provided at the top ends of the corresponding side members 11A in the auxiliary frame 11.

The front bosses 97A in the left and right lower arms 97 are connected, via rubber bushes 101, left-to-right oriented bolts 102, and the like, to brackets 14D provided at the longitudinal middles of the left and right side members 14A in the base frame 14. The rear bosses 97B are connected, via rubber bushes 101, left-to-right oriented bolts 102, and the like, to brackets 11G provided at the front ends of the corresponding side members 11A in the auxiliary frame 11.

The left and right upper arms 96 and the left and right lower arms 97 are set so that the left and right lower arms 97 are longer than the left and right upper arms 96, that the left and right upper arms 96 are positioned farther to the rear of the vehicle body than the left and right lower arms 97, and that the angles of the left and right upper arms 96 in relation to the vehicle body frame 1 are greater than the angles of the left and right lower arms 97 in relation to the vehicle body frame 1.

A lateral rod 98 is disposed in a left-to-right orientation at a position in the vehicle body that is farther inward than the rear end of the base frame 14, Connecting bosses 98A, 98B are integrally mounted at both ends of the lateral rod 98. The left boss 98A is connected, via a rubber bush 103, a longitudinally oriented bolt 104, and the like, to a bracket 14E provided at the rear end of the left side member 14A in the base frame 14. The right boss 98B is connected, via a rubber bush 103, a longitudinally oriented bolt 104, and the like, to a bracket 11H provided at the top end of the right side member 11A in the auxiliary frame 11.

Connecting bosses 99A, 99B are integrally mounted on both ends of the left and right dampers 99. The top bosses 99A are connected, via rubber bushes 105, longitudinally oriented bolts 106, and the like, to brackets 14F that project into the vehicle body in the rear parts of the side members 14A in the base frame 14. The bottom bosses 99B are connected to corresponding holders 11E in the auxiliary frame 11 via rubber bushes 105, longitudinally oriented bolts 106, and the like. Coil springs 100 are externally fitted over the dampers 99 so that shocks from the road are absorbed by the coil springs 100, and that the movement of the coil springs 100 is controlled by the dampers 99 (periodic vibrations of the coil springs 100 converge sooner).

In other words, the rear suspension 29 is configured so that the left and right upper arms 96 and lower arms 97 overlap with the left and right side members 11A of the base frame 14 as seen in a plan view, the lateral rod 98 is disposed at the rear end part which is farther inward in the vehicle body than the rear end of the base frame 14, and the left and right dampers 99 and coil springs 100 are placed adjacent to the corresponding side members 14A of the base frame 14 and are positioned farther inward in the vehicle body than the left and right side members 14.

It is thereby possible to avoid problems wherein other objects easily come into contact with the rear suspension 29 as a result of the rear suspension 29 protruding out from the base frame 14 to the side of the vehicle body, and it is also possible to ensure that a large space is formed between the base frame 14 and the auxiliary frame 11 suspended on the base frame 14 via the rear suspension 29. As a result, damage to the rear suspension 29 as a result of contact with other objects can be effectively prevented. The engine 8, the HST 9, the transmission 10, and other components can also be installed in the auxiliary frame 11 in a suitable manner in which there is enough space from the base frame 14 and other components. It is thereby possible to preemptively prevent problems in which the engine 8, the HST 9, the transmission 10, and other components come into contact with the base frame 14 and other components when the rear suspension 29 reduces vibrations or shocks from the road.

If, for example, the engine 8, the HST 9, and the transmission 10 are installed in the base frame 14, and the left and right rear wheels 12 are suspended on the base frame 14 via the rear suspension 29, then the left and right rear wheels 12 are displaced in relation to the engine 8, the HST 9, and the transmission 10 when the rear suspension 29 reduces vibrations or shocks from the road. Therefore, universal couplings or the like that allow the left and right rear wheels 12 to be displaced in relation to the engine 8, the HST 9, and the transmission 10 must be installed in the system for transmitting power to the left and right rear wheels 12.

By contrast, the engine 8, the HST 9, and the transmission 10 are mounted together with the left and right rear wheels 12 in the auxiliary frame 11 suspended on the base frame 14 via the rear suspension 29 in this multipurpose work vehicle. The engine 8, the HST 9, and the transmission 10 can thereby be displaced integrally together with the left and right rear wheels 12 in relation to the base frame 14 when the rear suspension 29 reduces vibrations or shocks from the road.

Therefore, universal couplings or the like that allow the left and right rear wheels 12 to be displaced in relation to the engine 8, the HST 9, and the transmission 10 do not need to be installed in the system for transmitting power to the left and right rear wheels 12.

In other words, the power transmission structure can be simplified and costs can be reduced by reducing the number of components through placement of the engine 8, the HST 9, and the transmission 10 together with the left and right rear wheels 12 in the auxiliary frame 11 suspended on the base frame 14 via the rear suspension 29.

Moreover, rubber bushes 101, 103, 105 are placed between the base frame 14 and the rear suspension 29 and also between the auxiliary frame 11 and the rear suspension 29, whereby twisting to the left and right can be absorbed by these rubber bushes 101, 103, 105. As a result, an inexpensive rigid axle suspension with a simple structure can be used as the rear suspension 29, and a smoother ride can be provided.

Since the engine 8 is supported in a vibration-proof manner on the base frame 14 via the rear suspension 29, vibration from the engine 8 can be prevented from reaching the base frame 14 without providing any engine-specific anti-vibration rubber components. Moreover, in cases in which engine-specific anti-vibration rubber components are provided, the power transmission system running from the engine 8 to the transmission 10 must be provided with hydraulic couplings or the like for allowing relative displacement therein, but no such universal couplings or the like are needed in this multi-purpose work vehicle. In other words, the configuration can be further simplified and costs further reduced by reducing the number of components, and an even smoother ride can be ensured.

A pair of left and right brackets 107 is installed on the bottom of the load-carrying platform 13 at a position that is behind the longitudinal middle, as shown in FIG. 19. The left and right brackets 107 are externally fitted over left-to-right oriented support shafts 108 provided at the rear ends of the base frame 14 in a manner that allows the brackets 107 to rotate relative to each other. Four rubber mounts 109 that are secured and supported by the base frame 14 are installed on the bottom of the load-carrying platform 13. A pair of left and right swinging links 110 is connected at one end to the longitudinal middle in the bottom of the load-carrying platform 13. Long holes 110A are formed at the other ends of the left and right swinging links 110, and left-to-right oriented stopping pins 111 provided at the rear of the base frame 14 are engageably inserted through these long holes 11A. Handles 112 are installed on the left and right sides at the front of the load-carrying platform 13.

Specifically, by grasping the handles 112 and pulling up the front side of the load-carrying platform 13, it is possible to switch the position of the load-carrying platform 13 from a carrying position in which the rubber mounts 109 are secured and supported by the base frame 14, to a dumping position in which the rubber mounts 109 are raised above the base frame 14 and in which the support shafts 108 come into contact with the front edges of the long holes 110A in the swinging links 110.

Concavities 110B that can engage with the stopping pins 111 are formed so as to recess upwards at the front ends of the long holes 110A in the swinging links 110.

Specifically, when the load-carrying platform 13 is switched to the dumping position, the concavities 110B engage with the support shafts 108 that have come into contact with the front edges of the long holes 110A, whereby the load-carrying platform 13 can be held at the dumping position. The position of the load-carrying platform 13 can be switched from dumping to carrying by grasping the handles 112 and releasing the engagement between the concavities 110B of the swinging links 110 and the stopping pins 111.

Figure 13:
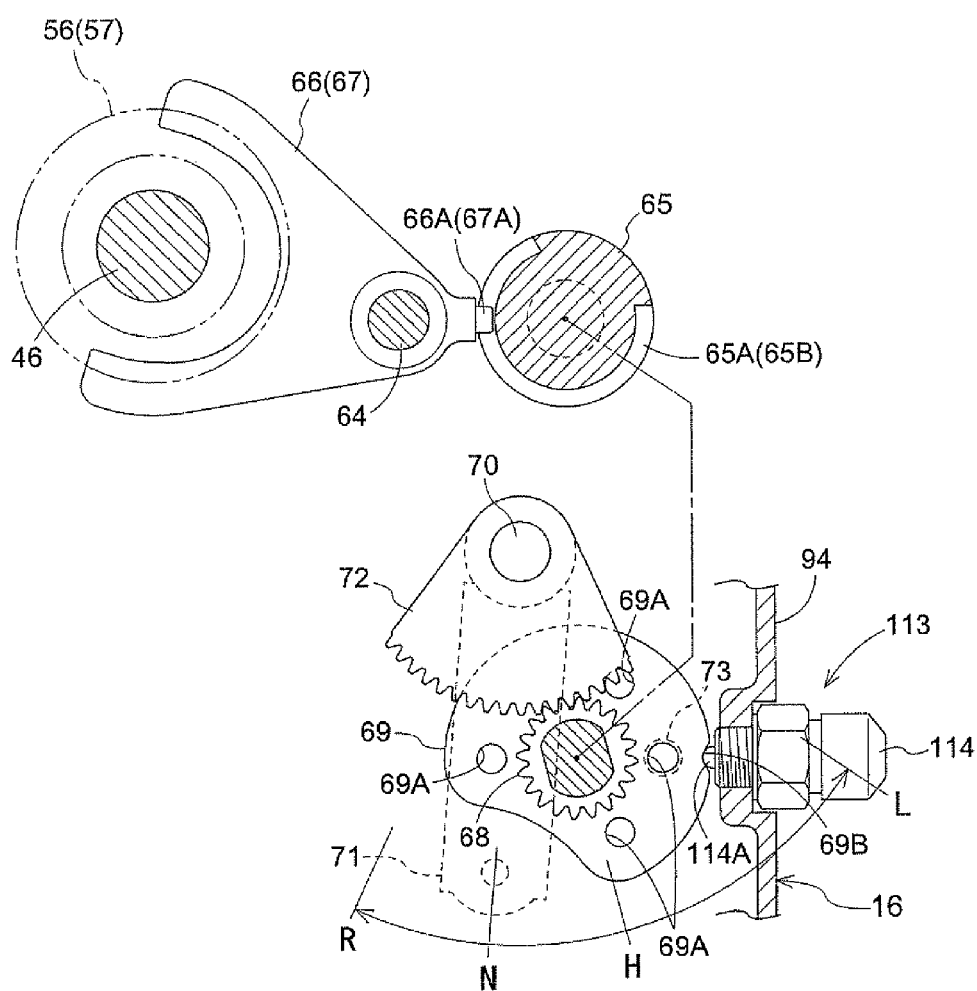
FIG. 13 is a partial longitudinal cross-sectional side view showing the operational structure of the transmission.

The transmission 10 is equipped with a detection mechanism 113 for detecting the neutral state of the transmission 10, as shown in FIG. 13. The detection mechanism 113 is configured from a neutral detection concavity 69B formed by recessing the external periphery of the disc 69 that rotates integrally with the camshaft 65, and a switch 114 that is switched to a closed state by the engageable insertion of an actuator 114A into the concavity 69B.

The switch 114 is a structural element of a startup restraint circuit (not shown) that restrains the engine 8 from starting up. The startup restraint circuit is configured so as to prevent the engine 8 from starting up in cases in which the switch 114 is open; i.e., in cases in which the transmission 10 is in neutral.

Other Embodiments

[1] The work vehicle may be a tractor, a lawn mower, a rice-planting machine, or the like.

[2] The work vehicle may be configured as a four-wheel drive vehicle in which the engine 8 and the transmission devices 9, 10 are placed in the front of the vehicle body, and the power from the engine 8 is transmitted via the transmission devices 9, 10 to the left and right front wheels 2 and the left and right rear wheels 12.

[3] The work vehicle may be configured as a rear-wheel drive vehicle in which the engine 8 and the transmission devices 9, 10 are placed in the rear of the vehicle body, and the power from the engine 8 is transmitted via the transmission devices 9, 10 to the left and right rear wheels 12.

[4] The work vehicle may be configured as a front-wheel drive vehicle in which the engine 8 and the transmission devices 9, 10 are placed in the front of the vehicle body, and the power from the engine 8 is transmitted via the transmission devices 9, 10 to the left and right front wheels 2.

[5] The transmission devices may include only the transmission 10, a belt-type continuously variable transmission instead of the HST 9, or a hydromechanical transmission (HMT) composed of the HST 9 and a planetary gear-type continuously variable transmission.

[6] A transmission that does not include the secondary hydraulic motor 37 may be used for the EST 9.

[7] A five-linkage type rigid axle suspension may be used as the front suspension 25; and an auxiliary frame 11 comprising the left and right front wheels 2, the engine 8, the transmission devices 9, 10, and other such components may be suspended via this front suspension 25 on the vehicle body frame 1.

[8] The engine 8 and the transmission devices 9, 10 may be installed in the auxiliary frame 11 so that the shafts 31, 38, 39, and 45 to 49 thereof are oriented longitudinally.

[9] The engine 8 and the transmission devices 9, 10 may be connected so as to be capable of power transmission via power transmission shafts, power transmission belts, and other such components.

[10] The five-linkage type rigid axle suspension used as the front suspension 25 or the rear suspension 29 may be designed so that either the left and right upper arms 96 are longer than the left and right lower arms 97, or the upper and lower arms are equal in length. The suspension may also be designed so that either the left and right upper arms 96 are positioned farther forward in the vehicle body than the left and right lower arms 97, or positions thereof in the longitudinal direction of the vehicle body are the same. Furthermore, the suspension may be designed so that either the angles of the left and right upper arms 96 in relation to the vehicle body frame 1 are less than the angles of the left and right lower arms 97 in relation to the vehicle body frame 1, or the angles of the upper and lower arms in relation to the vehicle body frame 1 are equal.

[11] The five-linkage type rigid axle suspension used as the front suspension 25 or the rear suspension 29 may be designed so that the right boss 98B in the lateral rod 98 is connected via a rubber bush 103, a longitudinally oriented bolt 104, and the like to the bracket 14E provided at the rear end of the right side member 14A in the base frame 14, and the left boss 98A in the lateral rod 98 is connected via a rubber bush 103, a longitudinally oriented bolt 104, or the like to the bracket 11H provided at the top of the left side member 11A in the auxiliary frame 11. Either one of the left and right bosses 98A, 98B of the lateral rod 98 connected to the bracket 11H provided to the auxiliary frame 11 may be connected via a rubber bush 103, a longitudinally oriented bolt 104, or the like to a bracket provided to the transmission case 16, the rear axle case 27, or the like installed on the auxiliary frame 11, instead of being connected to the bracket 11H of the auxiliary frame 11.

[12] The configuration of the auxiliary frame 11 can have various modifications in accordance with the installation placement of the engine 8 and the transmission devices 9, 10; the structure for connecting the engine 8 and the transmission devices 9, 10; the type of installed transmission devices 9, 10; the configuration of the five-linkage type rigid axle suspension used as the front suspension 25 or the rear suspension 29; or the like.

[13] A five-linkage type rigid axle suspension may be used as the front suspension 25.

[14] The link rigid axle suspension used for the suspension 25 or 29 may be a three-link suspension comprising a pair of left and right arms 97, a lateral rod 98, a pair of left and right coil springs 100, and a pair of left and right dampers 99.

[15] The configuration may be designed so that the transmission 10 is suspended along with the left and right front wheels 2 or the left and right rear wheels 12 on the vehicle body frame 1 via the front suspension 25 or the rear suspension 29.

[16] The configuration may be designed so that the transmission 10 and the HST 9 are suspended along with the left and right front wheels 2 or the left and right rear wheels 12 on the vehicle body frame 1 via the front suspension 25 or the rear suspension 29.

[17] The configuration may be designed so that the engine 8 and the transmission devices 9, 10 are suspended along with the left and right front wheels 2 or the left and right rear wheels 12 on the vehicle body frame 1 via the front suspension 25 or the rear suspension 29.

What is claimed is:

1. A work vehicle comprising:
a pair of left and right wheels;
a vehicle body frame supported at least partially by the pair of left and right wheels and including:
  a left side member and a right side member each extending in a longitudinal direction of a vehicle body, and
  a cross member for connecting the left side member to the right side member; and
a suspension for performing force transmission between the pair of left and right wheels and the vehicle body frame, the suspension being a five-linkage type rigid axle suspension including:
  a pair of left and right upper arms and a pair of left and right lower arms for positioning the pair of left and right wheels in the longitudinal direction of the vehicle body, each of the upper arms and lower arms being link-connected to the vehicle body frame at one end thereof;
  a lateral rod for positioning the pair of left and right wheels in the lateral direction of the vehicle body, the lateral rod being link-connected to the vehicle body frame at one end thereof;
  a pair of left and right coil springs for absorbing shocks from the road;
  a pair of left and right dampers for controlling the movements of the pair of left and right coil springs; and
  an auxiliary frame suspended on the vehicle body frame via the suspension and supported by the left and right pair of wheels, wherein an engine and a transmission device are mounted on the auxiliary frame.

2. The work vehicle of claim 1, wherein
the left upper arm is disposed at a position that substantially overlaps with the left side member as seen in a plan view; and
the right upper arm is disposed at a position that substantially overlaps with the right side member as seen in a plan view.

3. The work vehicle of claim 2, wherein
the left lower arm is disposed at a position that substantially overlaps with the left side member as seen in a plan view; and
the right lower arm is disposed at a position that substantially overlaps with the right side member as seen in a plan view.

4. The work vehicle of claim 1, wherein
the pair of left and right dampers and the pair of left and right coil springs are disposed inwardly of the left and right side members.

5. A work vehicle comprising:
a pair of left and right wheels;
a vehicle body frame supported at least partially by the pair of left and right wheels; and
a suspension provided between the pair of left and right wheels and the vehicle body frame, the suspension being a five-linkage type rigid axle suspension including:
  a pair of left and right upper arms and a pair of left and right lower arms for positioning the pair of left and right wheels in the longitudinal direction of the vehicle body;
  a lateral rod for positioning the pair of left and right wheels in the lateral direction of the vehicle body;
  a pair of left and right coil springs for absorbing shocks from the road;
  a pair of left and right dampers for controlling the movements of the pair of left and right coil springs; and
  an auxiliary frame for supporting the pair of left and right wheels, an engine, and a transmission device, wherein the auxiliary frame is suspended on the vehicle body frame via the suspension,
wherein the vehicle body frame has a left side member and a right side member;
the left upper arm is disposed at a position that substantially overlaps with the left side member as seen in a plan view; and
the right upper arm is disposed at a position that substantially overlaps with the right side member as seen in a plan view.

6. A work vehicle comprising:
a pair of left and right wheels;
a vehicle body frame supported at least partially by the pair of left and right wheels; and a suspension provided between the pair of left and right wheels and the vehicle body frame, the suspension being a five-linkage type rigid axle suspension including:

a pair of left and right upper arms and a pair of left and right lower arms for positioning the pair of left and right wheels in the longitudinal direction of the vehicle body;

a lateral rod for positioning the pair of left and right wheels in the lateral direction of the vehicle body;

a pair of left and right coil springs for absorbing shocks from the road;

a pair of left and right dampers for controlling the movements of the pair of left and right coil springs; and an auxiliary frame for supporting the pair of left and right wheels, an engine, and a transmission device, wherein the auxiliary frame is suspended on the vehicle body frame via the suspension, wherein the left lower arm is disposed at a position that substantially overlaps with the left side member as seen in a plan view; and the right lower arm is disposed at a position that substantially overlaps with the right side member as seen in a plan view.

7. The work vehicle of claim 5, wherein the left lower arm is disposed at a position that substantially overlaps with the left side member as seen in a plan view; and the right lower arm is disposed at a position that substantially overlaps with the right side member as seen in a plan view.

* * * * *